United States Patent [19]

Horton et al.

[11] Patent Number: 5,614,115
[45] Date of Patent: Mar. 25, 1997

[54] COMPUTER-CONTROLLED LASER CUTTER WITH OPTICAL SENSOR

[75] Inventors: Norman Horton; John K. Bell, both of Nottinghamshire, United Kingdom

[73] Assignee: Cadcam Technology Limited, Nottingham, United Kingdom

[21] Appl. No.: 532,560

[22] PCT Filed: Apr. 7, 1994

[86] PCT No.: PCT/GB94/00737

§ 371 Date: Oct. 4, 1995

§ 102(e) Date: Oct. 4, 1995

[87] PCT Pub. No.: WO94/23886

PCT Pub. Date: Oct. 27, 1994

[30] Foreign Application Priority Data

Apr. 8, 1993 [GB] United Kingdom ............... 9307421

[51] Int. Cl.⁶ .................................................. B23K 26/08
[52] U.S. Cl. ........................... 219/121.67; 219/121.82; 219/121.83; 364/474.08
[58] Field of Search ............... 219/121.67, 121.72, 219/121.73, 121.74, 121.75, 121.78, 121.6, 121.82, 121.84, 121.83; 83/938, 939; 364/470, 474.08

[56] References Cited

U.S. PATENT DOCUMENTS

| 3,422,246 | 1/1969 | Wetzel | 219/121.73 |
|---|---|---|---|
| 3,543,979 | 12/1970 | Grove et al. | 219/121.67 |
| 3,614,369 | 10/1971 | Medley | 219/121.72 |
| 3,742,183 | 6/1973 | Castro et al. | 219/121.67 |
| 4,391,168 | 7/1983 | Gerber et al. | 83/34 |
| 4,588,871 | 5/1986 | Etcheparre et al. | 219/121.67 |
| 4,769,523 | 9/1988 | Tanimoto et al. | 219/121.6 |
| 4,853,866 | 8/1989 | Andrada Galan et al. | 364/470 |
| 4,918,611 | 4/1990 | Shyu et al. | 219/121.67 |
| 5,188,009 | 2/1993 | Sunohara et al. | 83/939 |
| 5,200,592 | 4/1993 | Yabu | 219/121.67 |
| 5,262,612 | 11/1993 | Momany et al. | 219/121.67 |

FOREIGN PATENT DOCUMENTS

| 2667529 | 4/1992 | France . | |
| 61-206586 | 9/1986 | Japan | 219/121.85 |
| 63-63591 | 3/1988 | Japan . | |
| 0637249 | 12/1978 | U.S.S.R. | 219/121.67 |

OTHER PUBLICATIONS

International Search Report for International Applicaton No. PCT/GB 94/00737, dated Jun. 29, 1994.

*Primary Examiner*—Teresa J. Walberg
*Assistant Examiner*—Gregory L. Mills
*Attorney, Agent, or Firm*—Marshall, O'Toole, Gerstein, Murray & Borun

[57] ABSTRACT

A laser cutter for cutting textile or leather clothing material adhered on a stiff tacky backing sheet includes a laser which produces a laser beam, a guide head for reflecting and focusing the laser beam onto the sheet-backed clothing material, and an optical sensor mounted on the guide head for recognizing the shape or a pattern marked on the material. The material is supported by an idler roller. Under the control of a computer, a pair of bi-directionally driven pinch rollers move the material back and forth across the idler roller in synchronism with movement of the guide head transversely across the material. The computer alternately activates and controls the optical sensor or the laser. In an optical scanning mode, under control of the computer, the material is scanned to create in the computer memory a model of the desired pattern to be cut in the clothing material, and a desired cutting path matched to the shape of, or pattern on, the clothing material. While directing synchronous relative movement between the guide head and the clothing material, the computer causes the focus of the laser beam to cut the clothing material, but not the backing sheet, in the desired cutting path, permitting cut pieces thereafter to be peeled from the tacky backing sheet cutter.

6 Claims, 4 Drawing Sheets

COMPUTER-CONTROLLED LASER CUTTER WITH OPTICAL SENSOR

DESCRIPTION

TECHNICAL FIELD

The invention relates to a laser cutting machine for cutting out shapes in fabrics, particularly shapes for making up into clothing garments.

BACKGROUND OF THE INVENTION

It is known to use lasers to cut out shapes in clothing material, for making up into particular garments. Laser cutters are popular in this field as they can be used under computer control to give a clear and accurate cut which, in the case of artificial fabrics, will not fray.

In one common type of prior art laser cutter, a sheet of fabric is laid out on a flat cutting table above which a laser is supported in a support frame. The laser in its support frame is movable along two mutually perpendicular axes, and so can be made to describe, and therefore cut, any desired 2-dimensional shape in the material. Once the cutting is completed, the fabric is removed from the cutting table, and taken away for the pieces to be sewn up into a garment.

Such prior art laser cutters suffer from a number of drawbacks. Firstly, the entire laser and collimator apparatus, together with its support frame, must be mounted on tracks above the fabric, and moved around during the cutting process. This apparatus is extremely heavy and unwieldy, and large forces are required to shift it around. To move such a bulky apparatus with the precision required can be very problematic.

Secondly, the fabric must be laid flat on the table, cut, and then removed. This limits the speed of the operation, as the machine cannot be worked continuously, and also places a limitation on the sizes of fabrics which can be cut using the apparatus.

The larger the table, the more difficult it becomes to remove all the pieces of fabric from the table after completion of cutting. The area of the table is generally about 3 m×3 m and smaller cut pieces of fabric are easily mislaid during their removal. The sheer size of the apparatus causes other problems. The area that must be made available in a factory for the machine is even larger than the size of the cutting table. This extra space is required by the frame on which the laser is supported. The laser sits firm on its frame, which is moved from side to side and to and fro, to cause the movement of the laser according to a chosen pattern. Space must therefore be provided for the extension of the frame beyond the cutting table, when the laser is positioned close to the edge of this table.

Such prior art laser cutters pose serious health and safety problems. To keep people away from the laser beam during operation of the cutter, access to the cutting table must be prevented. Therefore, guards should ideally be placed around the whole perimeter of this table. However, an even larger area may be hazardous due to the swinging out of the laser frame during operation, as mentioned previously. As soon as the cutting of a particular sheet of fabric has been completed, access is required once more to the cutting table to remove the material. This makes it very difficult to work out and enforce sensible safety regulations.

A second prior art laser cutter is similar to that already described, except that the cutting table is moved around instead of the laser, which is kept stationary. In this case the cutting table is freely moveable along two mutually perpendicular axes so that any desired shape of garment may be cut. In such a cutter, the problems of moving the bulky laser and is overhead support frame are eliminated, but the cutting table is also very bulky and new problems are created when trying to move it around. In addition, the other drawbacks discussed with reference to the first prior art cutter, such as health and safety consideration and factory space, apply equally to this second cutter.

U.S. Pat. No. 5,200,592 combines elements of both the above prior art laser cutters. The fabric is cut on a cutting table the top surface of which is a belt conveyor. The fabric can be laid out flat on the cutting table directly from a roll. A stationary laser is used, but the focus point is moved over the flat laid-out fabric by a series of mirrors which move the focus point in two mutually perpendicular directions. A number of shapes are thus cut from the flat laid-out fabric and are than discharged into a bin by advancement of the belt conveyor which also draws new fabric from the roll to continue the cutting process. The cutting table of U.S. Pat. No. 5,200,592 is necessarily large, to permit cutting of garment-sized panels of fabric.

THE INVENTION

The invention provides a laser cutter comprising: a laser and optionally a collimator mounted in a fixed frame for producing a static laser beam; material support means parallel to but spaced from the static laser beam for supporting sheet material to be cut; a guide head mounting reflecting and focusing means for deflecting the laser beam onto material supported by the support means and focusing the beam on the material to cut it; and means for effecting relative movement between the focus point of the laser beam and the material supported by the support means, to cut the material in a desired pattern, characterized in that the means for effecting the relative movement comprises bi-directional material feed means for moving the sheet material to be cut transversely of the material support means; a fixed rail for guiding bi-directional movement of the guide head in a line parallel to the material support means; means for effecting bi-directional movement of the guide head along the fixed rail; and a microprocessor control for synchronously controlling the means for effecting bi-directional movement of the guide head and the bi-directional feed means so as to cause the focus point of the laser beam to follow the desired pattern on the sheet material to be cut.

The use of such a cutter does not necessitate the movement of the entire laser and optional collimator to cut a pattern in the material. The laser is stationary, with its beam being directed so that it runs alongside or above, and parallel to, the material to be cut. The beam can then be intercepted by the mobile reflecting and focusing means, which is movable to and fro along the direction of the laser beam, and which focuses the beam on the material beside or beneath it. This movement of the focusing means enables the point of focus, or cutting point, of the laser to be moved freely along a line of material while the bulky laser and optional collimator are left stationary. It has been found that a sufficiently precisely collimated laser beam can be produced to allow substantial movement of the focusing means, and hence the cutting point, without adversely affecting the performance of the laser cutter. It has also been found that a relatively low power laser may be used, in comparison to the laser used in the prior art. This gives a clean cut without any burning of the fabric, and in addition, allows the size of the laser to be reduced.

Movement of the reflecting and focusing means of course only provides movement of the cutting point in one dimension, along one particular line of material. To enable a two dimensional shape to be cut in the material, further relative movement of the material and the cutting point, preferably in a direction perpendicular to the movement of the focusing means, is required. This is achieved by moving the material transversely to the direction of movement of the focusing means, using bi-directional material feed means, so that the particular line of material along which the cutting point can travel is not fixed but variable. By simultaneously controlling the movement of the material, and the perpendicular movement of the focusing means, and hence cutting point, any desired shape may be cut.

It is no longer necessary to rest the material on a flat bed for cutting, as only one particular line of material need be in the cutting position at any one instant. In a preferred embodiment, the material support means is an idler roller over which the material is drawn, and the bi-directional material feed means comprise a supply roller and take-up roller for the sheet material, and means (such as a pair of pinch rollers) for transferring the material from the supply roller to the take-up roller and vice versa over the idler roller.

The size of the whole apparatus is therefore substantially reduced, and many of the problems associated with prior art cutters are eliminated. The zone to which access must be prevented during laser operation is confined to two linear regions one on each side of the material support means. The problem of the overhead frame swinging out during laser movement is no longer present, since the laser is stationary and only the reflecting and focusing means move.

In addition, it is no longer necessary to reach over a cutting table to remove cut material, which is now simply rolled off the material support means on command.

The movement of the focusing means, and the action of the material feed means, is generally controlled by a computer. This can receive data relating to a garment to be made, from which information it may calculate the sizes and shapes of the pieces necessary to make up the garment, and the optimum arrangement of these pieces on a run of material. The user may participate in the preparation of the cutting plan, if he has particular preferences, or may leave the computer to carry out the whole process. The computer is then able to translate the garment information into movement commands to be sent to the material feed means and the focusing means, so that the cutting of garment pieces may begin.

The invention as described above is the subject of U.S. Pat. No. 5,262,612 which was first published on 1993 Nov. 16, and permits the cutting of the sheet material in a desired pattern where that pattern is created first on paper and then transferred to a computer memory, or created within computer memory by means of a CAD program. The present invention also provides a modification of the above basic apparatus and method which permits the laser cutter to cut around shapes or patterns marked on the sheet material itself, in a novel and inventive manner.

In the modification, the guide head which mounts the reflecting and focusing means also mounts an optical sensor capable of recognizing a shape or pattern on sheet material supported by the material support means, and the movement of the guide head, the movement of the bi-directional feed means and the activation of the laser are all under the control of a computer which receives as input the output of the optical sensor. The computer has two working modes: scan and cut. In the scan mode the laser is turned off, and the guide head and bi-directional feed means are actuated in synchronism so that the optical sensor scans the shape or pattern on the sheet material. Still in the scan mode, the computer creates in memory a model of the desired pattern to be cut in the sheet material, and a desired cutting path, matched to the shape or pattern on the sheet material. Optionally this desired pattern can be displayed on a computer screen, and an opportunity allowed for an operator to review or modify the pattern before the computer enters its cut mode. In the cut mode, the computer controls the laser in synchronism with the guide head and bi-directional feed means to cut the material in the desired cutting path.

The shape or pattern on the sheet material may be a shape or pattern of marks on the sheet material or of the edge of a useful portion of the sheet material. For example, the laser cutter of the invention can be used to cut leather for the footwear or clothing industry. A complete skin or a number of skins of leather is supported on an adhesive backing paper and presented to the laser cutter on a roll. In the scan mode, the laser cutter identifies the edges of the leather skins. If the optical sensor if sufficiently sensitive, the same scan mode can also analyze the quality of the skins, identifying the location of marks, holes or blemishes which would make individual skin areas unsuitable for particular applications but suitable for others. The computer analysis would then match the range of shapes to be cut to the available skin area and would select the best cutting pattern. Finally in the cutting mode the laser would be focussed to cut through the leather of the skins but not the backing paper, cutting around the outlines of the desired shapes. At the end of the process, individual shapes could be peeled off the backing paper as needed.

The shape or pattern could alternatively be a shape or pattern applied to the sheet material to be cut either during or after its manufacture. For example, in the case of a patterned fabric, a predefined desired cutting pattern could be accurately aligned with the pattern of the fabric or with specific target marks on the fabric in the scan mode, prior to the cut mode.

Finally, the above modification enables the laser cutter of the invention actually to create the desired cutting path in computer memory so as to follow the shape or pattern on the sheet material. To achieve this latter function the computer preferably analyzes the signals received from the optical sensor and using shape recognition and/or shape enhancement algorithms or programs there is constructed, in computer memory, a model of the desired pattern to be cut in the sheet material.

The above modification greatly extends the use of the laser cutter of the invention, and permits the cutting out of shapes that have been pre-printed onto or embroidered or woven into the material, without the cutter necessarily following errors or deviations in the outlines of the printed embroidered or woven shapes.

DRAWINGS

FIG. 1A is a schematic side view of a microprocessor, keyboard and display screen according to the present invention.

PREFERRED EMBODIMENT

Figure 1:
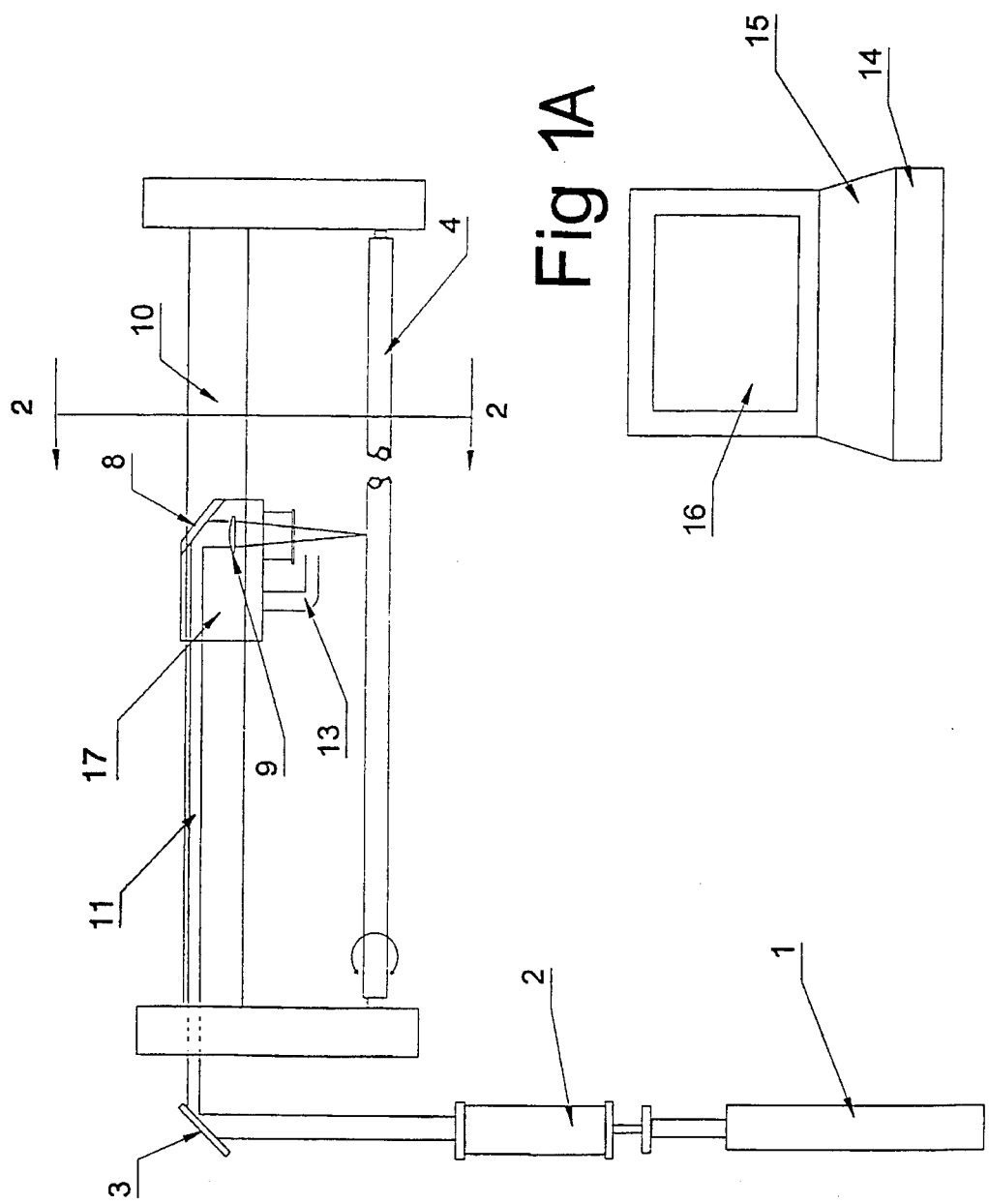
FIG. 1 is a schematic side view of a laser cutter according to the invention.
Figure 2:
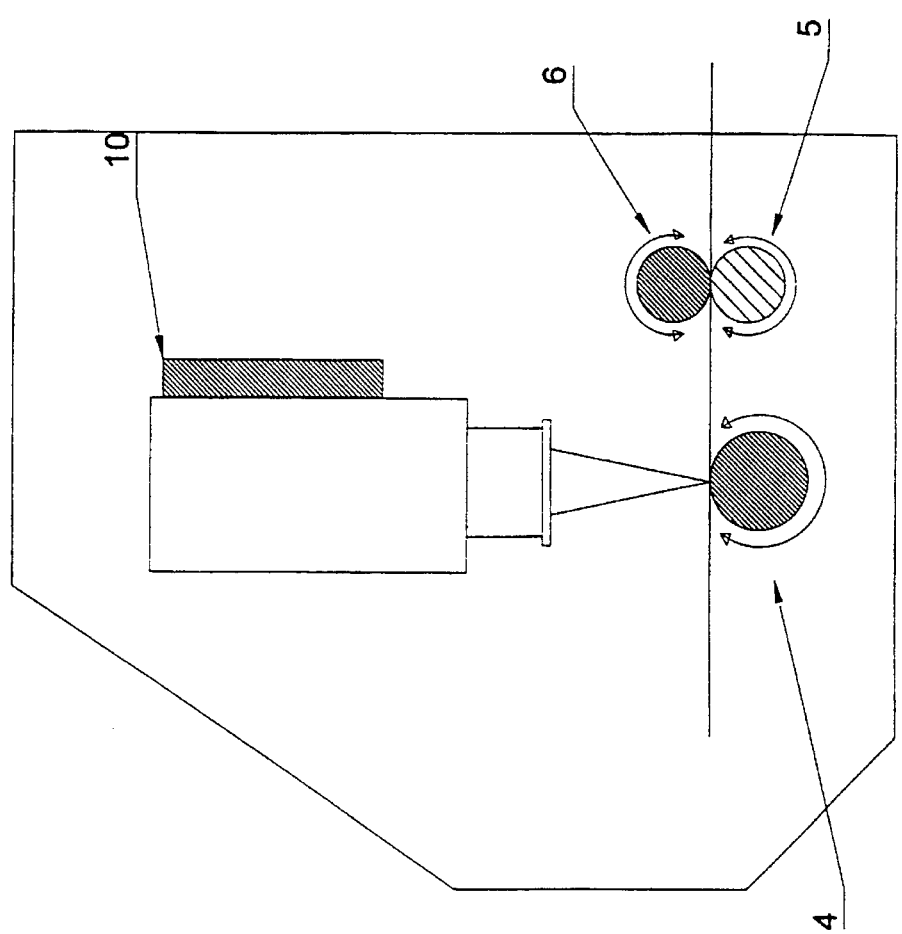
FIG. 2 is a cross section of the laser cutter of FIG. 1 viewed in the direction X—X.

Referring first to FIGS. 1 and 2, a laser 1 and collimator 2 produce a laser beam 11. The beam 11 is deflected by a mirror 3 to run above and parallel to an aluminium roller 4 on which material is supported. Also running above and parallel to the aluminium roller 4 is a rail 10 on which a guide head 17, together with reflecting and focusing means comprising a mirror 8 and a lens 9 are movably mounted. The reflecting and focusing means are positioned so that the laser beam 11 hits the mirror 8, and is deflected through the lens 9 which focuses the beam on the material supported by the roller 4.

Referring to FIG. 2, the point of focus, and therefore the cutting point of the beam, may be positioned anywhere on the line of material resting on the apex of the roller 4.

Near to the aluminium roller 4 is a material feed means comprising a pinch wheel 6 and a knurled roller 5. Sheet material is gripped between these two wheels and fed, by their rotation, towards or away from the aluminium roller 4. Hence the particular line of material on the roller's apex, i.e. the material which may be cut, is altered. If the laser cutter is to be used to cut fabric material, then the sheet material is a textile fabric but in that case it is preferably backed on to stiff paper or a similar backing sheet, so that it may easily be pushed into or pulled away from the cutting position on the aluminium roller 4. During cutting, the laser beam is focused just above the backing sheet, so that the textile fabric is cut but the backing sheet left intact. In this way complicated patterns involving the movement of the textile fabric backwards and forwards across the roller 4, can be cut without any textile fabric becoming misplaced or the tension in the material being adversely affected. Even if substantial cuts are made in the textile fabric, the backing sheet remains as a firm base which is easily gripped and moved around. The textile fabric can easily be peeled off the backing sheet when it is required.

The laser 1 is of relatively low power and produces a beam which does not cause any burning of the fabric, although for artificial fabrics, a slight melting of the cut edge is allowed to prevent fraying.

The sheet material being cut is constantly cooled and cleaned by an airflow system 13. This includes blowing and sucking tubes mounted on the cutting head which together establish a high speed flow of cold air over the cutting area. This airflow sucks away fluff and residue, at the same time as keeping the whole area cool. This enables a very clean, sharp cut to be produced in the sheet material.

The machine is controlled by a microprocessor 14 connected to a keyboard 15 and a display screen 16 (FIG. 1A). When the machine is used in the manufacture of a clothing garment, the keyboard 15 allows the user to type in data relating to the garment to be made. This information may consist of a person's measurements for instance, and the computer may then allow the user to choose a garment from a selection of styles held in memory. Once the data has been entered and the choice made, the computer calculates the sizes and shapes of all the pieces necessary to make up the chosen garment. It may then work out the most economical way of fitting them on to a particular piece of material, possibly taking into account material pattern or weave direction. Alternatively, the user may opt to view the garment pieces on the screen 16, and do this arranging himself via the keyboard 15 or via a mouse.

Once the user is happy with the garment pieces and their orientation, the computer translates the garment information into movement control signals for the material feed means and the reflecting and focusing means. These are sent on command to the laser cutter, and cutting of the material, according to the chosen pattern, takes place automatically.

Figure 3:
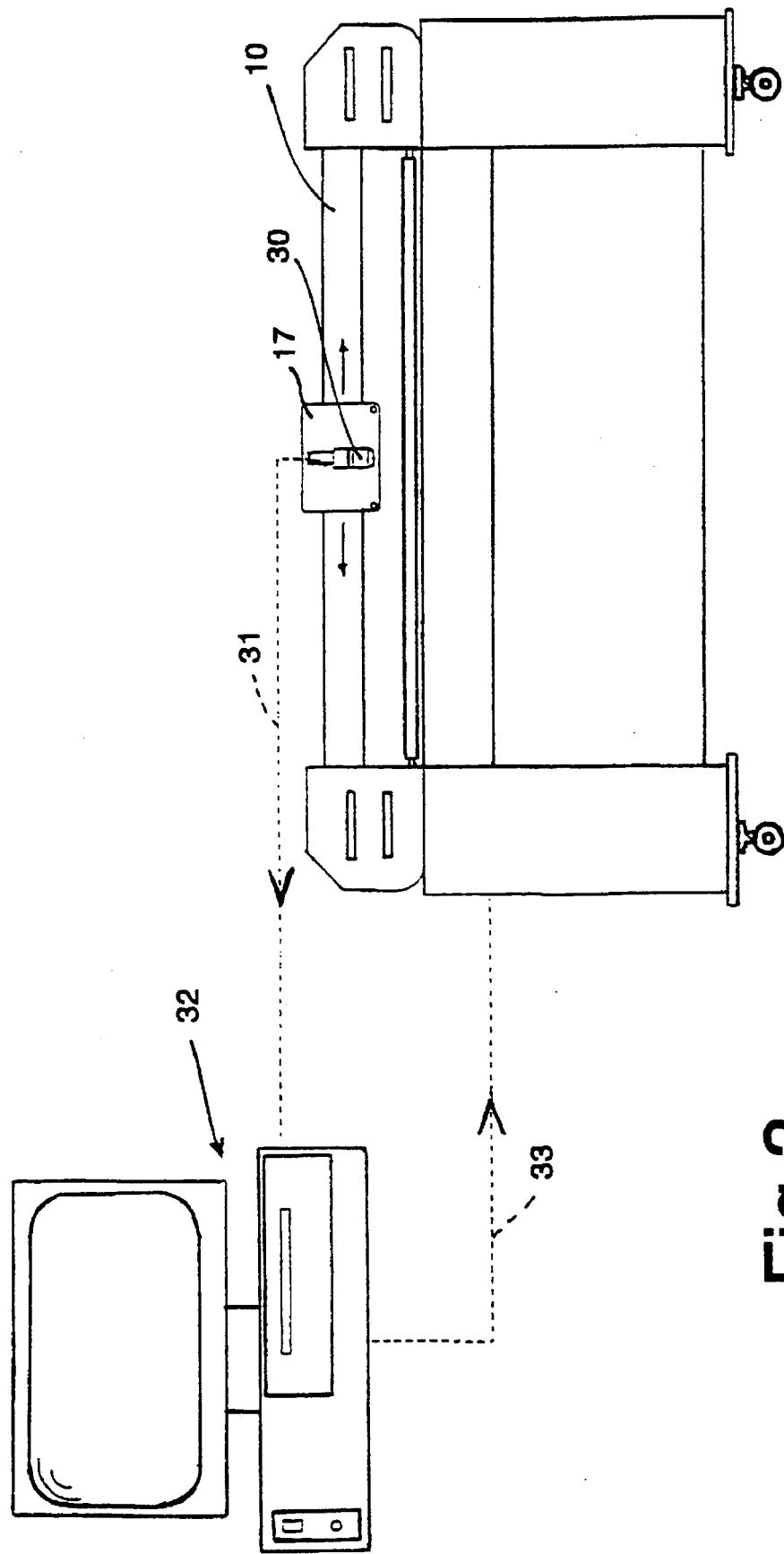
FIG. 3 is a schematic side view of a laser cutter according to a modification of the invention.
Figure 4:
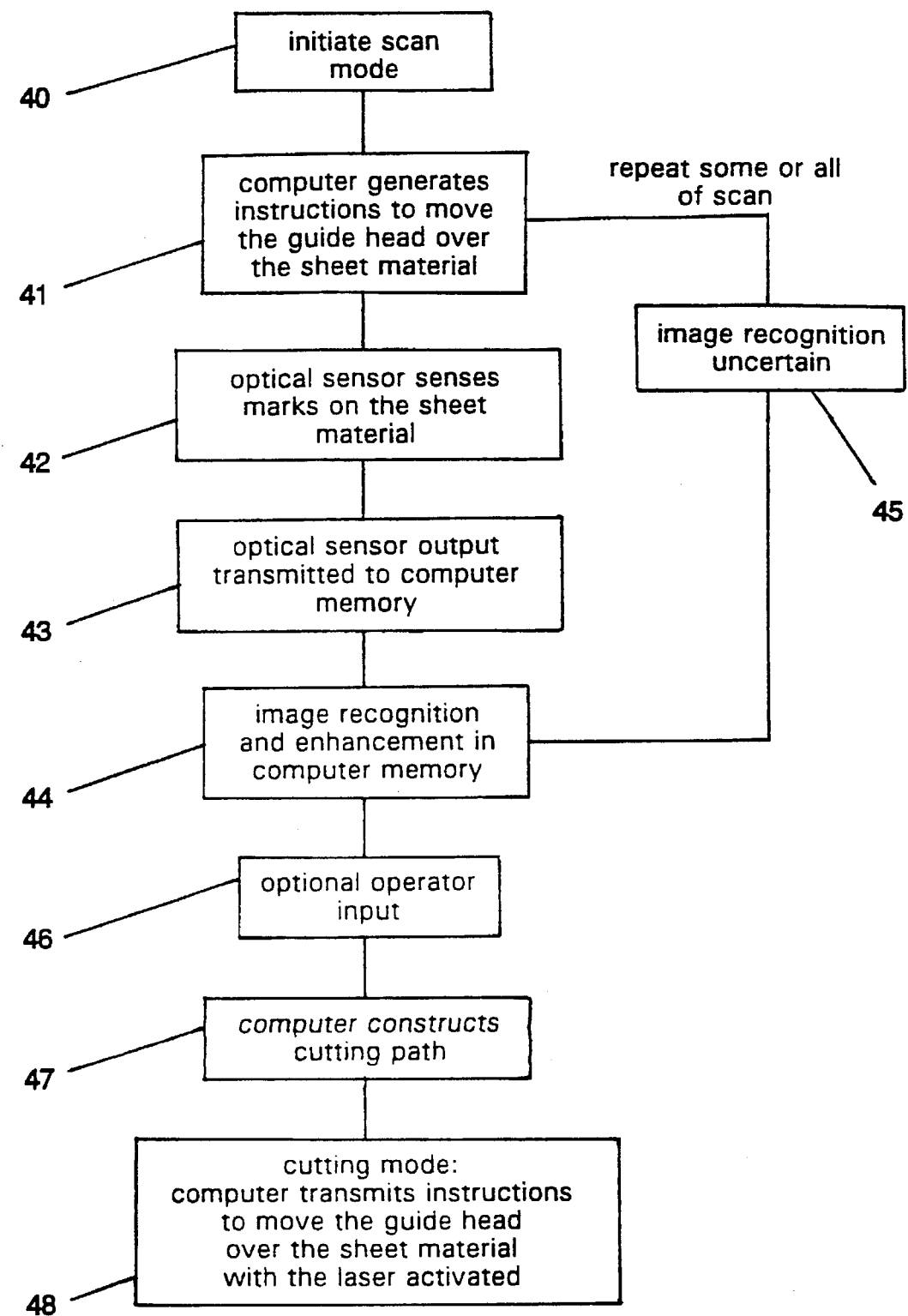
FIG. 4 is a flow chart of the sequence of actions, using the laser cutter of FIG. 3, required to cut a desired pattern from sheet material.

In the modification illustrated in FIGS. 3 and 4, the same or equivalent parts as those of FIGS. 1 and 2 have been given the same reference numbers. In FIG. 3 an optical sensor 30, such as a lightweight miniature camera, is attached to the guide head 17 alongside the mirror 8 and lens 9. The optical sensor 30 can recognize marks on the sheet material passing over the roller 4, and delivers its output over a line 31 to a computer 32.

The computer 32 operates in scan and cut modes. In the scan mode it sends drive signals over a line 33 to move the guide head 17 reciprocally along the rail 10 while simultaneously controlling the material feed means to complete an optical scan of the pattern marked on the sheet material. The results of the scan are passed back to the computer over the line 31.

The computer 32 is programmed to analyze the scan results to construct a computer image of the pattern marked on the sheet material. The program includes image recognition and image enhancement algorithms, permitting the computer to make an intelligent assessment of the desired shape or pattern to be cut from the sheet material. If desired, an operator-assisted phase can be included at this stage to permit the pattern to be displayed on the computer screen and modified before the computer is set into its cut mode.

In the cut mode, the computer 32 controls the laser cutter over the line 33 to guide the laser beam around the periphery of the pattern to be cut. The result is a substantially smoother and cleaner line of cut than if the scanning and laser cutting were performed simultaneously.

FIG. 4 is a flow chart illustrating the above operating sequence. Box 40 indicates initiation of the scan mode of the computer 32, which in box 41 causes the computer to generate instructions for moving the guide head 17 and the material feed means so that the guide head 17 moves over the whole of the surface of the sheet material. Box 42 indicates the sensing by the optical sensor 30 of the pattern marked on the surface of the sheet material, the output of the sensor 30 being transmitted back to the computer over line 31 as indicated in box 43. In computer memory, image recognition and optionally image enhancement algorithms are used at 44 to generate a computer image of the desired cutting pattern, and the scan mode of the computer is preferably interactive with the image recognition algorithm so that any portion of the marked pattern which is not recognized with certainty can be re-scanned as indicated at 45.

When a certain pattern outline has been recognized in box 44, the operator may be given an opportunity, represented by box 46, to modify that outline before at box 47 the computer constructs an optimum cutting path to cut the outline of the desired shape or pattern. Box 48 illustrates the cut mode, in which the computer 32 drives the laser cutter to cut the desired shape or pattern.

What is claimed is:

1. A laser cutter for cutting textile or leather clothing material adhered on a stiff backing sheet coated with a tacky peelable adhesive, said material and backing sheet together being capable of being easily pushed or pulled, said cutter comprising:

(a) a laser and collimator mounted in a fixed frame for producing a laser beam;

(b) material support means comprising an idler roller parallel to and spaced from the laser beam for supporting the sheet-backed clothing material to be cut;

(c) a guide head, mounting reflecting and focusing means for deflecting the laser beam onto the sheet-backed clothing material supported by the idler roller and for focusing the beam to a point on the material so as to cut the material but not the backing sheet;

(d) an optical sensor mounted on the guide head for recognizing the shape of or a pattern marked on said sheet-backed clothing material supported by the idler roller, (e) means for effecting relative movement between the guide head and the sheet-backed clothing material supported by the idler roller, comprising:

(1) a pair of bi-directionally driven pinch rollers parallel to and spaced from said idler roller for moving the sheet-backed clothing material to be cut back and forth across the idler roller, (2) a fixed rail for guiding bi-directional movement of the guide head in a line parallel and adjacent to the idler roller, (3) means for effecting bi-directional movement of the pinch rollers, and (4) means for effecting synchronous bi-directional movement of the guide head along the fixed rail; and (f) computer means comprising a memory and a microprocessor control for the laser beam, the optical sensor and the means for effecting relative movement, comprising:

(1) means for selectively activating and deactivating the laser and the optical sensor, (2) means for optically scanning the sheet-backed clothing material to be cut while the optical sensor is activated and for creating in the memory a model of a desired pattern to be cut in the sheet-backed clothing material, and a desired cutting path matched to the shape of or pattern on the sheet-backed clothing material, and (3) means for controlling the means for synchronously moving the pinch rollers and the guide head while the laser is activated so as to cause the focus point of the laser beam to cut the sheet-backed clothing material but not the backing sheet in the desired cutting path, permitting cut pieces thereafter to be peeled from the tacky backing sheet.

2. A laser cutter according to claim 1, wherein the computer means further comprises:

means for identifying, from markings on the sheet-backed clothing material to be cut, areas from which cut pieces are to be taken and areas from which no cut pieces are to be taken, and means for modifying said desired cutting path accordingly.

3. A laser cutter according to claim 1, wherein said means for creating in the computer memory a model of the desired pattern to be cut includes means for optically scanning an outline of the desired pattern to be cut marked on the sheet-backed clothing material, and means for analyzing signals received from the optical sensor and using shape recognition or shape enhancement algorithms to construct the model in memory of the desired pattern to be cut.

4. A laser cutter according to claim 1, wherein the computer means includes a screen on which a model of the desired pattern can be displayed prior to cutting, and means for modifying the desired pattern by operator input prior to activation of the laser to establish the cutting mode along the desired cutting path.

5. A laser cutter according to claim 1, wherein the computer means includes means for recording in the memory the outline of the clothing material on its backing sheet, and the means for creating the desired cutting path includes means for selecting the cutting pattern for optimum utilization of the clothing material.

6. A laser cutter according to claim 5, wherein the computer means further comprises:

means for identifying, from markings on the sheet-backed clothing material to be cut, areas from which cut pieces are to be taken and areas from which no cut pieces are to be taken, and means for modifying said desired cutting path accordingly.

* * * * *